United States Patent [19]

Gorman

[11] Patent Number: 5,607,166
[45] Date of Patent: Mar. 4, 1997

[54] LOW FRICTION FLUID SEAL DEVICE WITH HINGE AND ROLL STRUCTURE

[75] Inventor: G. W. Gorman, Midlothian, Tex.

[73] Assignee: Gorman Company, Inc., Cedar Hill, Tex.

[21] Appl. No.: 573,193

[22] Filed: Dec. 15, 1995

[51] Int. Cl.[6] .............................. F16J 15/32; F16J 15/48
[52] U.S. Cl. .................. 277/27; 277/176; 277/177; 277/188 R; 277/215
[58] Field of Search ................................. 277/27, 29, 165, 277/170, 176, 177, 188 R, 188 A, 206 A, 215

[56] References Cited

U.S. PATENT DOCUMENTS

| 3,554,569 | 1/1971 | Gorman . | |
|---|---|---|---|
| 3,642,293 | 2/1972 | Woodling | 277/206 A |
| 5,149,107 | 9/1992 | Maringer et al. | 277/176 |
| 5,377,999 | 1/1995 | Gorman . | |
| 5,509,670 | 4/1996 | Wheeler | 277/188 R |

FOREIGN PATENT DOCUMENTS

| 547268 | 10/1957 | Canada | 277/188 R |
|---|---|---|---|
| 761779 | 11/1956 | United Kingdom | 277/165 |
| 1289141 | 9/1972 | United Kingdom | 277/165 |
| 1437358 | 5/1976 | United Kingdom | 277/188 R |
| 2099522 | 12/1982 | United Kingdom | 277/165 |

*Primary Examiner*—Scott Cummings
*Attorney, Agent, or Firm*—Richard E. Jenkins, P.A.

[57] ABSTRACT

A fluid seal device comprising an annular body having an inner side, an outer side, a closed end face and an at least partly open end face wherein the at least partly open end face defines a first radial sealing area protruding outwardly from the outer side and a second radial sealing area protruding outwardly from the inner side of the annular body so that the plane defined by the first radial sealing area is spaced apart a further distance from the closed end of the annular body than the plane defined by the second radial sealing area. The at least partly open end face of the fluid seal device defining the first and second radial sealing areas is formed of a less rigid elastomeric material than the remaining portion of the annular body of the fluid seal device so that the radius of the second radial sealing area will tend to hinge and roll and to thereby maintain a generally constant resistance during movement of an element in contact therewith.

13 Claims, 5 Drawing Sheets

LOW FRICTION FLUID SEAL DEVICE WITH HINGE AND ROLL STRUCTURE

TECHNICAL FIELD

The present invention relates to pressure seal devices. More particularly, it relates to an improved pressure seal or packing member for sealing against a differential pressure and between an internal surface of a cylinder and an outer cylindrical surface of a member disposed therewithin wherein the sealing elements of the pressure seal are adapted to present a substantially constant surface contact area when hydraulic oil pressure is applied to the seal during use.

RELATED ART

As is well known to those skilled in the fluid seal device art, there are several general types of fluid seal devices of a type suitable for use with a ram and cylinder (as well as other well known applications) under pressure loading conditions. Applicant believes that all of these seals provide an undesirable increase in friction when oil pressure is applied thereto during use. In other words, the contact area tends to increase when hydraulic oil pressure is applied thereto during use and consequently the friction between the ram and cylinder under pressure loading conditions is correspondingly increased. This can result in a tendency for the ram within the cylinder to jump or jerk and thereby provide an uneven motion to an elevator, etc. operatively connected to the hydraulic cylinder.

One basic type of fluid seal device is the U-type seal ("U seal") such as is well represented by applicant's own U.S. Pat. No. 3,554,569. This type of pressure seal possesses great efficacy for initial sealing of hydraulic cylinders but also suffers from a tendency toward increased resistance between the ram and cylinder under hydraulic oil pressure loading conditions. The increased resistance inherent in this type of seal also can result in a tendency for the ram to jerk or jump and impart the same to associated mechanisms (such as elevators) operatively connected to the hydraulic cylinder. A similar tendency toward increased friction under hydraulic oil pressure loading conditions is also well known to be inherent in other types of hydraulic seals such as O-ring seals that are used in hydraulic elevators, farm machinery, construction equipment and the like.

The prior art seals under hydraulic pressure all tend to be compressed within the annular cavity in which the seal resides and against the ram wall by the hydraulic oil pressure applied thereunder during movement of the cylinder ram, and the friction between the seal and the cylinder ram is significantly increased due to the increased surface area of the fluid seal that is brought into contact with the cylinder ram. This well known tendency of prior art fluid seals to compress and present a greater surface contact area and increased friction with the moving cylinder ram can result in premature seal deterioration and "jerkiness" or "jumpiness" in the movement of a mechanism operatively connected to the hydraulic cylinder. The same phenomenon is also known when the prior art fluid seal is used in a piston head to seal the moving piston head against the cylinder wall within which the piston moves.

Thus, there is a long-felt need for a fluid seal device which does not provide increased resistance when subjected to hydraulic oil pressure thereunder during relative movement of the cylinder ram or piston head associated therewith. Applicant has now invented such an advancement in the art with the low friction fluid seal device of the invention which will now be described in specific detail hereinbelow.

DISCLOSURE OF THE INVENTION

In accordance with the present invention, applicant provides an improvement to fluid seal devices or pressure seals (also known as packing seals or packing members) of the type suitable for uses such as sealing an annular space between an internal surface of a cylinder and a member having an outer cylindrical surface as well as for other applications such as within a piston head to seal the piston head against the cylinder wall within which the piston head moves, etc.

The fluid seal device comprises an annular body having an inner side and an outer side, a closed end face, and an at least partly open end face defining a first radial sealing area protruding outwardly from the outer side and a second radial sealing area protruding outwardly from the inner side of the annular body. The at least partly open end face defining the first and second radial sealing areas is formed of a less rigid elastomeric material than the remaining portion of the annular body. The plane defined by the first radial sealing area is spaced apart a further distance from the closed end of the annular body than the plane defined by the second radial sealing area. The radius of the second radial sealing area will tend to hinge and roll and present a substantially constant surface contact area when hydraulic oil pressure is applied to the at least partly open end face of the fluid seal device during use thereof.

Accordingly, it is an object of the present invention to provide an improved fluid seal device that tends to present a constant contact surface area to the moving member in contact therewith during use.

It is another object of the present invention to provide an improved fluid seal device that does not provide increased resistance during movement of the moving member in contact therewith.

It is yet another object of the present invention to provide an improved fluid seal device that does not tend to impart jerkiness or jumpiness to a mechanism operatively associated with the hydraulic cylinder or the like in which the seal is used.

Some of the objects of the invention having been already stated, other objects will now become evident as the description proceeds, when taken in connection with the accompanying drawings described hereinbelow.

BEST MODE CARRYING OUT THE INVENTION

Figure 1:
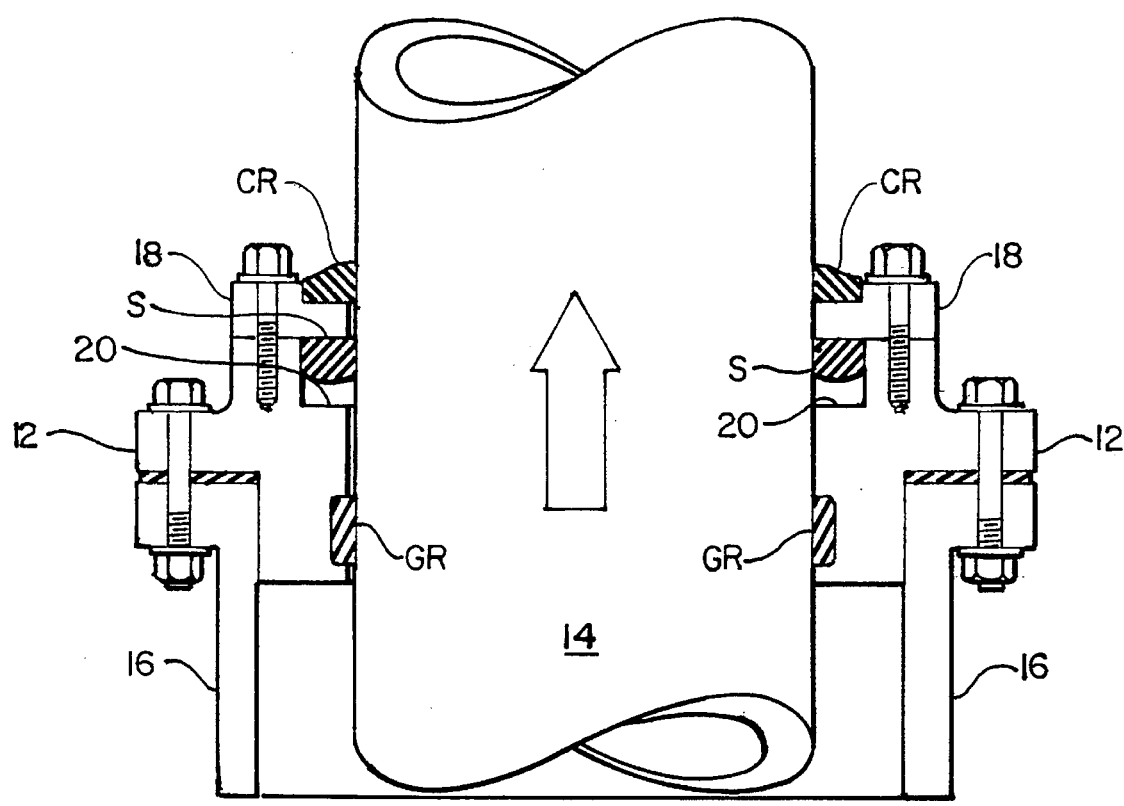
FIG. 1 is a schematic elevational view, partly in section, showing a prior art seal device in a typical installation and being subjected to hydraulic pressure.

Referring now to FIGS. 1–7 of the drawings, FIG. 1 shows a prior art seal device (O-ring) in a typical installation such as a hydraulic elevator wherein prior art fluid seal device S forms a seal between the cylinder head 12 and ram or jack plunger 14 in the hydraulic elevator apparatus. In this type of installation, ram or jack plunger 14 normally supports the elevator car and movement of the plunger is controlled by pressure of hydraulic fluid within jack cylinder 16. Cylinder head 12 is affixed to the upper end of cylinder 16 in a conventional manner, and a cap ring 18 is affixed to the upper end of cylinder head 12 in a conventional manner so as to carry conventional wiper ring CR. A guide ring GR is carried by cylinder head 12 in order to constrain lateral movement of ram or jack plunger 14. As previously stated, applicant notes that all of the structure just described is conventional and well known in the art.

Also, an annular cavity 20 with a square or rectangular cross-section shape is provided in cylinder head 12 for receipt of prior art O-ring fluid seal device S therein. As best seen in FIG. 1 and as is well known in the art, during movement of ram or jack plunger 14 hydraulic oil tends to be pushed under seal device S and to apply a high hydraulic pressure thereto that causes seal device S to deform and be squeezed into the upper portion of annular cavity 20. The deformed and squeezed seal device S acts to provide an increased surface area in contact with moving ram or jack plunger 14 and thereby to significantly increase the friction therebetween. The increased friction between compressed or deformed seal device S and ram or jack plunger 14 during its movement tends to cause jerks or jumps in the movement of the jack plunger. This problem is well known and is inherent in all known prior art seals, including conventional U-cup and O-ring seals. Moreover, the high friction phenomenon is found not only in the use of seals for hydraulic cylinders in elevator cars but also in farm machinery, construction equipment, automotive applications, etc.

Figure 2:
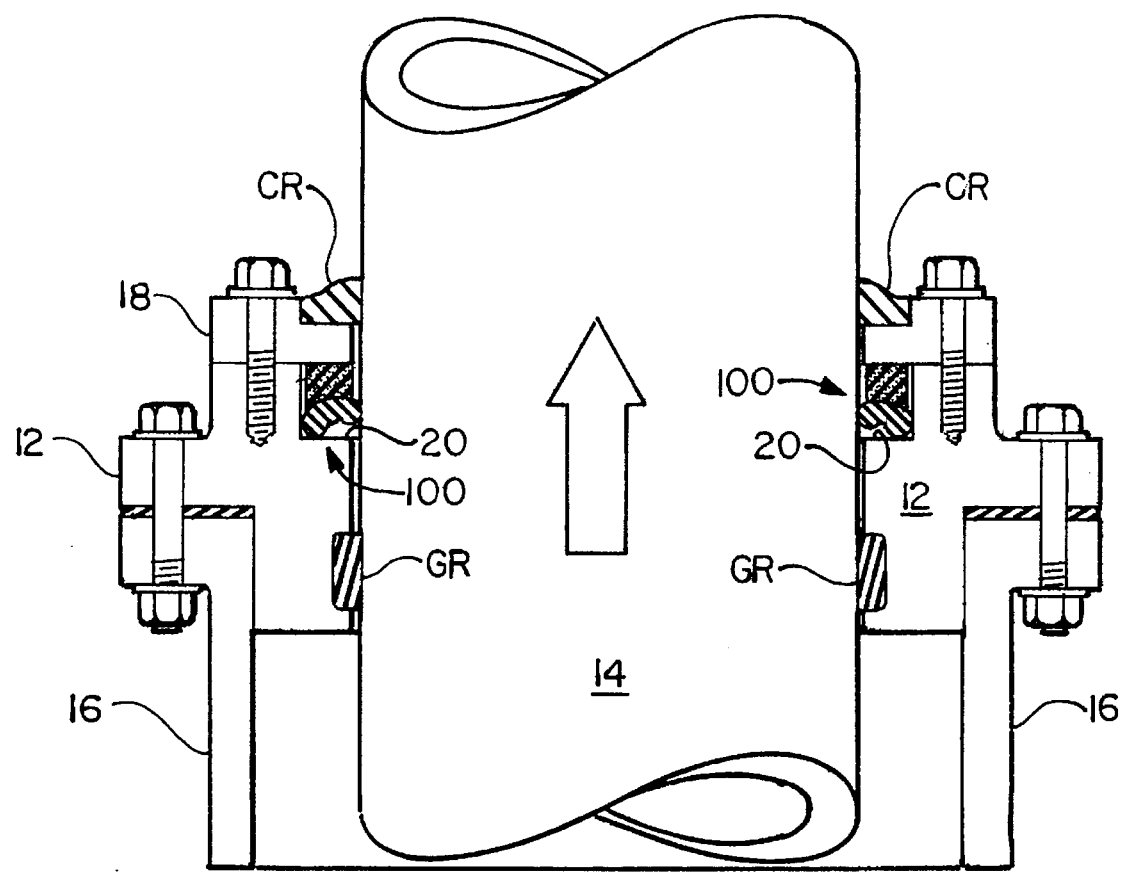
FIG. 2 is a schematic elevational view, partly in section, showing a fluid seal device in accordance with a preferred embodiment of the present invention in a typical installation and being subjected to hydraulic pressure.

Referring now to FIGS. 2–7 of the drawings, FIG. 2 depicts applicant's novel seal 100 in annular cavity 20 of the installation (ram and cylinder head) shown in FIG. 1 of the drawings. Packing ring or seal 100 is generally in the form of an annulus or ring having a body 120, a closed end face 140, an at least partly open end face 160, an inner side 180 and an outer side 190 (see FIGS. 4 and 5). The at least partly open end face 160 has a plurality of shallow cavities 160A therein wherein the cavities are symmetrically disposed within the body 120 of seal 100. Also, a plurality of ribs 160B are provided between adjacent shallow cavities 160A. Cavities 160A extend only partly into partly open end face 160 and do not extend into body 120 of seal 100 or to a depth near closed end face 140.

Figure 5:
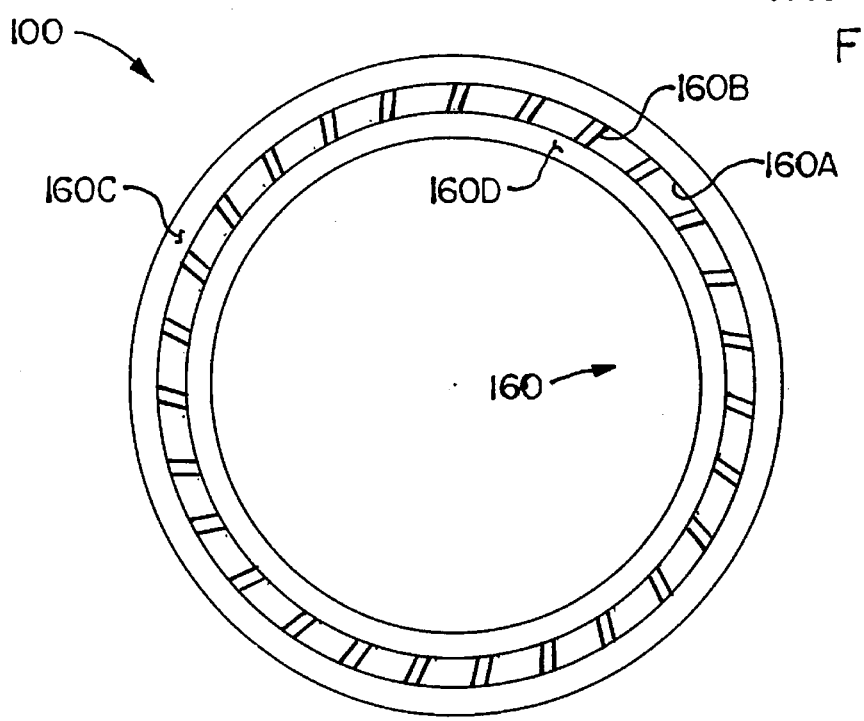
FIG. 5 is a bottom plan view of the fluid seal device shown in FIG. 4.
Figure 6:
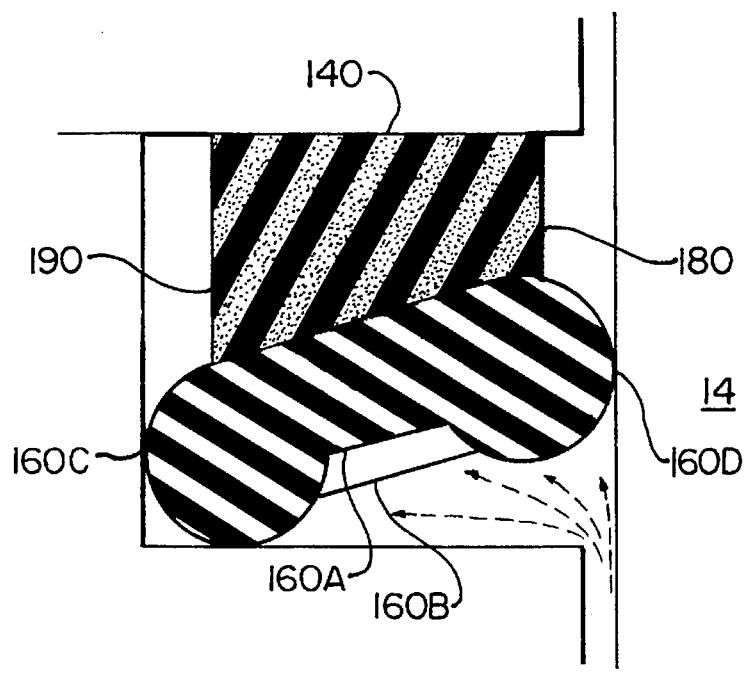
FIG. 6 is a vertical cross-sectional view of a fluid seal device in accordance with a preferred embodiment of the present invention in the installation shown in FIG. 2 wherein the cylinder ram is stationary or under low pressure.

Partly open end face 160 has integrally formed outer radial sealing area 160C and inner radial sealing area 160D (see FIGS. 5 and 6). Outer radial sealing area 160C is formed on the outer side of body 120 and inner radial sealing area 160D is formed on the inner side of body 120 of seal 100. Outer radial sealing area 160C serves to assure a positive static seal, and inner radial sealing area 160D serves to provide dynamic positive sealing and low friction during contact with ram or jack cylinder 14. Likewise, in the piston head and cylinder installation shown in FIG. 3, inner radial sealing area 160D serves to assure a positive static seal, and outer radial sealing area 160C serves to provide dynamic positive sealing and low friction contact during contact with cylinder wall 54.

Figure 7:
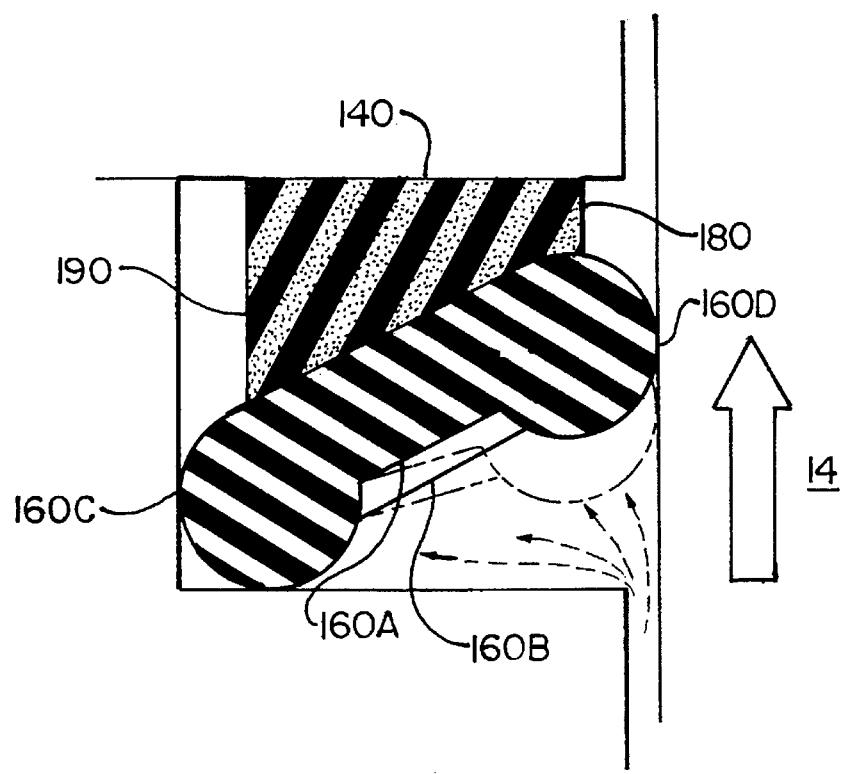
FIG. 7 is a vertical cross-sectional view of the fluid sealing device shown in FIG. 6 during upward movement of the cylinder ram wherein hydraulic oil pressure is applied to the underside of the fluid seal device and wherein the inner radial sealing area has hinged and rolled upwardly while presenting a substantially constant contact surface area to the cylinder ram.

As best seen in FIGS. 6 and 7, closed end face 140, inner side 180 and outer side 190 of seal 100 define a substantially square cross-section formed of a more rigid elastomeric material than at least partly open end face 160 affixed thereto. For example, the first portion of seal 100 may be formed of a high durometer rubber and the remaining portion of seal S represented by partly open end face 160 may be formed from a lower durometer rubber of less rigidity. The higher rigidity portion of seal 100 defines an interface with the lower rigidity elastomeric portion of seal 100 formed by partly open end face 160. Both outer radial sealing area 160C and inner radial sealing area 160D protrude outwardly from the relatively high rigidity elastomeric portion of seal 100 as best seen in FIGS. 6 and 7 of the drawings. Preferably, outer sealing area 160C is formed so as to define a plane that is spaced further from closed end face 140 than the plane defined by inner sealing area 160D that is positioned closer to end face 140 of seal 100. However, although the configuration described hereinabove is preferred, alternative embodiments include (1) outer sealing area 160C and inner sealing area 160D being spaced apart an equal distance from closed end face 140 or (2) inner sealing area 160D being formed so as to define a plane that is spaced further from closed end face 140 than the plane defined by outer sealing area 160C.

Typically, seal 100 is positioned in a hydraulic cylinder so as to allow hydraulic oil to go up and thereunder during movement of hydraulic ram or jack plunger 14 (see FIGS. 2 and 6–7). However, a distinction between applicant's seal 100 and prior art seal devices S (see FIG. 1) in this type of installation is that dynamic inner radial sealing area 160D will tend to hinge and roll around the more rigid elastomeric portion of seal 100 defined by outer wall 190, inner wall 180 and closed end face 140 due to its relatively greater flexibility during movement of ram 14. Due to the inherent tendency of dynamic inner radial sealing area 160D to hinge and roll and to present a relatively constant contact surface area to ram 14 during movement thereof, seal 100 does not provide appreciably increased frictional contact with ram or jack plunger 14 during its movement.

The tendency of dynamic inner sealing area 160D to hinge and roll when subjected to hydraulic pressure from oil being forced thereunder during movement of ram 14 allows seal 100 to maintain a relatively constant contact surface area and frictional resistance in the installation shown in FIG. 2, and obviates "jerkiness" and "jumpiness" induced in hydraulic cylinder movement by prior art seals due to their tendency to be compressed within annular cavity 20 by the hydraulic oil pressure applied thereunder. The result is that seal 100 tends to last longer than conventional prior art seal devices as well as to perform in a more desirable manner by overcoming the well known shortcomings of "jumpiness" and "jerkiness" of hydraulic cylinder performance due to increased friction between a prior art seal and an associated ram or jack plunger during movement of the ram or jack plunger.

Figure 3:
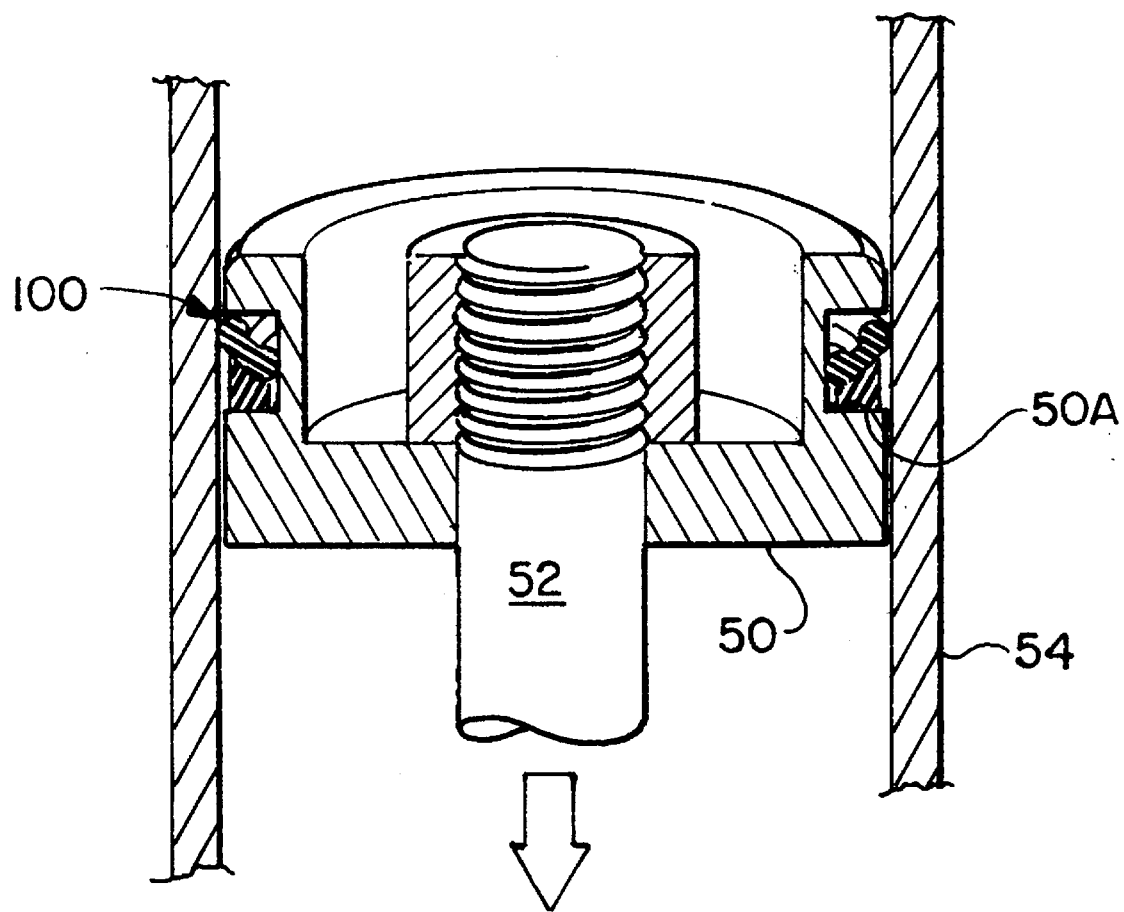
FIG. 3 is a schematic elevational view, partly in section, showing a fluid seal device in accordance with a preferred embodiment of the present invention in another typical installation and being subjected to hydraulic pressure.
Figure 4:
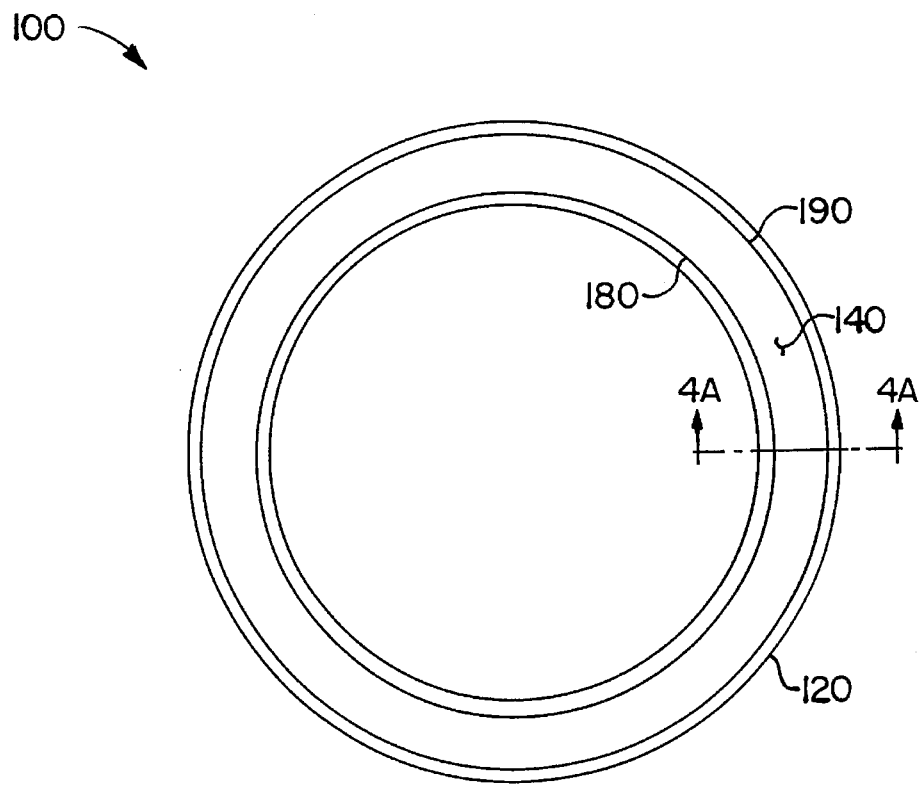
FIG. 4 is a top plan view of a seal device in accordance with a preferred embodiment of the present invention.
Figure 4A:
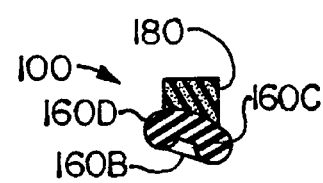
FIG. 4A is a cross-sectional view of the seal device of FIG. 4.

Conversely, when seal 100 is placed into annular cavity 50A of piston 50 of the piston head and cylinder installation shown in FIG. 3 (wherein piston head drives piston rod 52 within cylinder 54), outer radial sealing area 160C serves to provide dynamic positive sealing and low friction during contact with cylinder 54 and inner radial sealing area 160D serves to assure a positive static seal with annular cavity 50A of piston head 50. Outer radial sealing area 160C acts to provide the aforementioned dynamic positive sealing by virtue of the phenomenon wherein sealing area 160C tends to hinge and roll to present a relatively constant surface area to cylinder 54 during movement of piston head Applicant contemplates that seal 100 may be made in substantially any size and shape to accommodate conventional uses, and that seal 100 may be formed from any conventional elastomeric compound (such as rubber) wherein the first portion is more rigid and is reinforced with a suitable reinforcing material or has a higher durometer reading than the second portion of seal 100 represented by partly open end face 160. Also, seal 100 is sized so as to have a calculated minimum interference when installed that varies with the size of the radius of sealing area 160C and the radius of sealing area 160D (that in turn vary with the cross-sectional size of seal 100).

It Will be understood that various details of the invention may be changed without departing from the scope of the invention. Furthermore, the foregoing description is for the purpose of illustration only, and not for the purpose of limitation—the invention being defined by the claims.

What is claimed is:

1. A fluid seal device suitable for use in sealing an annular space between an internal surface of a cylinder and a member therein having an outer cylindrical surface, comprising:
   (a) an annular body having an inner side and an outer side, a closed end face, and an at least partly open end face defining a first radial sealing area protruding outwardly from said outer side and a second radial sealing area protruding inwardly from said inner side of said annular body; and
   (b) said at least partly open end face comprising said first radial sealing area and said second radial sealing area being formed of a less rigid elastomeric material than the remaining portion of said annular body;
   whereby said first radial sealing area or said second radial sealing area will tend to hinge and roll towards said closed end of said annular body and present a substantially constant surface contact area with a cylindrical surface when hydraulic oil pressure is applied to said at least partly open end face of said fluid seal device during use thereof and said cylindrical surface moves against said first or second radial sealing area.

2. A fluid seal device according to claim 1 wherein said first radial sealing area is spaced-apart a further distance from said closed end of said annular body than said second radial sealing area.

3. A fluid seal device according to claim 1 wherein said inner side, outer side and closed end face of said annular body define a substantially square cross section portion of said annular body.

4. A fluid seal device according to claim 3 wherein said substantially square cross section portion of said annular body is formed of a more rigid elastomeric material than said remaining at least partly open end face.

5. A fluid seal device according to claim 1 wherein said at least partly open end face of said annular body defines a plurality of relatively shallow cavities therein that do not extend below said second radial sealing area and that are symmetrically disposed about the central axis of said annular body, and a plurality of ribs that are also symmetrically disposed about the central axis of said annular body with each rib defining end walls of adjacent shallow cavities.

6. A fluid seal device according to claim 5 wherein said plurality of shallow cavities do not extend below said first radial sealing area.

7. A fluid seal device according to claim 1 wherein said first and second radial sealing areas comprise first and second lips, respectively.

8. A fluid seal device suitable for use in sealing an annular space between an internal surface of a cylinder and a member therein having an outer cylindrical surface, comprising:
   (a) an annular body having an inner side and an outer side, a closed end face, and an at least partly open end face defining a first radial sealing area protruding outwardly from said outer side and a second radial sealing area protruding inwardly from said inner side of said annular body;
   (b) said at least partly open end face comprising said first radial sealing area and said second radial sealing area being formed of a less rigid elastomeric material than the remaining portion of said annular body; and
   (c) said first radial sealing area being spaced-apart a further distance from said closed end of said annular body than said second radial sealing area;
   whereby said first radial sealing area or said second radial sealing area will tend to hinge and roll towards said closed end of said annular body and present a substantially constant surface contact area with a cylindrical surface when hydraulic oil pressure is applied to said at least partly open end face of said fluid seal device during use thereof and said cylindrical surface moves against said first or second radial sealing area.

9. A fluid seal device according to claim 8 wherein said inner side, outer side and closed end face of said annular body define a substantially square cross section portion of said annular body.

10. A fluid seal device according to claim 9 wherein said substantially square cross section portion of said annular body is formed of a more rigid elastomeric material than said remaining at least partly open end face.

11. A fluid seal device according to claim 8 wherein said at least partly open end face of said annular body defines a plurality of relatively shallow cavities therein that do not extend below said second radial sealing area and that are symmetrically disposed about the central axis of said annular body, and a plurality of ribs that are also symmetrically disposed about the central axis of said annular body with each rib defining end walls of adjacent shallow cavities.

12. A fluid seal device according to claim 11 wherein said plurality of shallow cavities do not extend below said first radial sealing area.

13. A fluid seal device according to claim 8 wherein said first and second radial sealing areas comprise first and second lips, respectively.

* * * * *